United States Patent
Price et al.

(10) Patent No.: US 10,887,406 B2
(45) Date of Patent: Jan. 5, 2021

(54) DYNAMIC CONTENT LOADING SELECTION

(71) Applicant: Google LLC, Mountain View, CA (US)

(72) Inventors: Thomas Graham Price, San Francisco, CA (US); Justin Lewis, South San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/612,823

(22) PCT Filed: Aug. 16, 2017

(86) PCT No.: PCT/US2017/047170
§ 371 (c)(1),
(2) Date: Nov. 12, 2019

(87) PCT Pub. No.: WO2019/035824
PCT Pub. Date: Feb. 21, 2019

(65) Prior Publication Data
US 2020/0145504 A1    May 7, 2020

(51) Int. Cl.
*H04L 29/08* (2006.01)
*G06N 20/00* (2019.01)
(Continued)

(52) U.S. Cl.
CPC .......... *H04L 67/20* (2013.01); *G06F 16/9577* (2019.01); *G06N 5/04* (2013.01);
(Continued)

(58) Field of Classification Search
CPC ......... H04L 67/20; H04L 67/02; H04L 67/42; G06N 20/00; G06N 5/04; G06F 16/9577
See application file for complete search history.

(56) References Cited

U.S. PATENT DOCUMENTS

| 9,015,348 B2 | 4/2015 | Hofmann et al. |
| 2010/0180192 A1 | 7/2010 | Hall |

(Continued)

OTHER PUBLICATIONS

PCT International Search Report and Written Opinion in International Application No. PCT/US2017/047170, dated Sep. 26, 2017, 14 pages.

(Continued)

*Primary Examiner* — Kristie D Shingles
(74) *Attorney, Agent, or Firm* — Fish & Richardson P.C.

(57) ABSTRACT

Methods, systems, and apparatus, including computer programs encoded on a computer storage medium, for dynamically selecting a content loading technique are disclosed. In one aspect, a method includes the actions of receiving a request for third-party content. The actions further include generating a first loading score that reflects a likelihood that a third-party content item that is selected using the first third-party content loading technique will render on a display of the client device. The actions further include generating a second loading score that reflects a likelihood that a third-party content item that is selected using the second third-party content loading technique will render on the display. The actions further include comparing the first and second loading scores. The actions further include selecting the first third-party content loading technique. The actions further include selecting and providing a given third-party content item.

20 Claims, 5 Drawing Sheets

(51) Int. Cl.
*G06F 16/957* (2019.01)
*G06N 5/04* (2006.01)
*H04L 29/06* (2006.01)

(52) U.S. Cl.
CPC .............. *G06N 20/00* (2019.01); *H04L 67/02* (2013.01); *H04L 67/42* (2013.01)

(56) References Cited

U.S. PATENT DOCUMENTS

| | | |
|---|---|---|
| 2013/0326337 A1 | 12/2013 | Lehmann et al. |
| 2014/0365853 A1* | 12/2014 | Kleinhout ............. G06F 16/951 715/205 |
| 2015/0039686 A1* | 2/2015 | Chetlur ................ H04L 67/306 709/204 |
| 2017/0206189 A1 | 7/2017 | Houle |
| 2017/0237801 A1* | 8/2017 | Baluja .................. H04L 67/325 709/217 |

OTHER PUBLICATIONS

PCT International Preliminary Report on Patentability in International Application No. PCT/US2017/047170, dated Feb. 18, 2020, 9 pages.

\* cited by examiner

DYNAMIC CONTENT LOADING SELECTION

CROSS-REFERENCE TO RELATED APPLICATIONS

This application is a national stage application under 35 U.S.C. § 371 of PCT International Application No. PCT/US2017/047170, filed Aug. 16, 2017. The contents of the foregoing application are hereby incorporated by reference.

TECHNICAL FIELD

This specification generally relates to selecting loading techniques for content.

BACKGROUND

A user may access content on a client device by accessing a web browser or other application. The content may include first-party content and third-party content.

SUMMARY

Internet connected devices are becoming more prevalent around the world. Yet, not all internet connected devices have the processing power and network bandwidth to handle some of the more processor and network intensive content loading techniques. On one hand, a newer device with modern processing capabilities, with updated applications, and connected to a Long-Term Evolution ("LTE") network is likely able to process multiple lines of code written in a scripting language (e.g., JAVASCRIPT®) and display animated content items. On the other hand, an older device with limited processing power, with antiquated applications, and connected to a 2G network may not be able to process as many lines of a script and properly display animated content items. If a content server instructed an older device to process many lines of a script and display animated content items, then the older device may not load any content at all, thus degrading the user experience.

To increase the chances of older devices being able to display content without negatively impacting the user experience, a content server may analyze characteristics of the client device to determine how content should be loaded. The characteristics may include the IP address, the user agent, and the cookie ID (or another unique identifier, such as user account information). The IP address may reflect a location of the client device. The user agent may reflect a model of the client device and applications running on the client device. The cookie ID or another identifier may reflect information related to the user. The content server may apply a model to the characteristics of the client device. The model may generate scores for different content loading techniques and select the content loading technique that improves the chances that the content will render effectively, for example such that the content is both properly displayed and displayed in a timely manner, on the client device. By properly and timely rendering the content on the client device, the chances of the user interacting with that content are improved. The content server may select the content loading technique dynamically such that the content server selects an appropriate content loading technique each time the client device requests content.

According to an innovative aspect of the subject matter described in this application, a method for dynamically selecting a content loading technique includes the actions of receiving, by a computing device, a request for third-party content, the request including data identifying characteristics of the client device onto which the third-party content will load; based on the data identifying the characteristics of the client device, generating, for a first third-party content loading technique, a first loading score that reflects a likelihood that a third-party content item that is selected using the first third-party content loading technique will render on a display of the client device; based on the data identifying the characteristics of the client device, generating, for a second third-party content loading technique, a second loading score that reflects a likelihood that a third-party content item that is selected using the second third-party content loading technique will render on the display of the client device; comparing the first loading score to the second loading score; based on comparing the first loading score to the second loading score, selecting the first third-party content loading technique; selecting, using the first third-party content loading technique, a given third-party content item; and providing, for output, the given third-party content item.

These and other implementations can each optionally include one or more of the following features. The actions further include receiving, by the computing device, an additional request for third-party content, the additional request including different data identifying the characteristics of the client device onto which the third-party content will load; based on the different data identifying the characteristics of the client device, generating, for the first third-party content loading technique, an additional first loading score that reflects an additional likelihood that an additional third-party content item that is selected using the first third-party content loading technique will render on the display of the client device; based on the different data identifying the characteristics of the client device, generating, for the second third-party content loading technique, an additional second loading score that reflects an additional likelihood that an additional third-party content item that is selected using the second third-party content loading technique will render on the display of the client device; comparing the additional first loading score to the additional second loading score; based on comparing the additional first loading score to the additional second loading score, selecting the second third-party content loading technique; selecting, using the second third-party content loading technique, an additional given third-party content item; and providing, for output, the additional given third-party content item.

The characteristics of the client device include a browser version, a model of the client device, and a network connection type. The first loading score further reflects a likelihood that a user will select the third-party content item that is selected using the first third-party content loading technique. The second loading score further reflects a likelihood that a user will select the third-party content item that is selected using the second third-party content loading technique. The actions further include receiving data identifying characteristics of a plurality of client devices, third-party loading techniques used to load a plurality of third-party content items on the plurality of client devices, data indicating whether each third-party content item rendered on a display of a respective client device, and data indicating whether a user selected each third-party content item; and using the data identifying characteristics of the plurality of client devices, the third-party loading techniques used to load the plurality of third-party content items on the plurality of client devices, the data indicating whether each third-party content item rendered on the respective client device, and the data indicating whether a user selected each third-party content item, training a model that is configured to generate a loading score that reflects a likelihood that a third-party content item that is selected using a given third-party content loading technique will render on a display of a given client device and that a user will select the third-party content item.

The first loading score and the second loading score are generated using the model. The actions further include receiving data indicating that the third-party content item rendered on the display of the client device; receiving data indicating that a user selected the third-party content item; and based on the data indicating that the third-party content item rendered on the display of the client device and based on the data indicating that the user selected the third-party content item, updating the model. The client device displays the given third-party content item in a first-party document and loads the first-party document using a loading technique that is different than the first third-party content loading technique and the second third-party content loading technique. The actions further include before receiving the request for third-party content, storing, by the computing device and on the client device, a plurality of third-party content items that correspond to a plurality of third-party content display requests. The action of selecting, using the first third-party content loading technique, the given third-party content item includes analyzing the plurality of third-party content display requests; and, based on analyzing the plurality of third-party content display requests, selecting, from among the plurality of third-party content items, a third-party content item as the given third-party content item.

The action of selecting, using the first third-party content loading technique, the given third-party content item includes accessing, from one or more servers, a plurality of third-party content display requests and corresponding third-party content items; analyzing the plurality of third-party content display requests; and, based on analyzing the plurality of third-party content display requests, selecting a third-party content item as the given third-party content item. The action of selecting, using the first third-party content loading technique, the given third-party content item includes accessing a plurality of third-party content display requests and corresponding third-party content items; analyzing the plurality of third-party content display requests; based on analyzing the plurality of third-party content display requests, selecting a third-party display request; and providing, to the client device, the third-party display request. The client device (i) selects, from among the third-party display request and other third-party display requests received from other servers, a given third-party display request that corresponds to the given third-party content item based on analyzing the third-party display request and the other third-party display requests and (ii) requests the given third-party content item.

Other embodiments of this aspect include corresponding systems, apparatus, and computer programs recorded on computer storage devices, each configured to perform the operations of the methods.

Particular embodiments of the subject matter described in this specification can be implemented so as to realize one or more of the following advantages. A system may select a third-party content loading technique that is appropriate for the client device. If a client device does not have significant processing capability or network bandwidth, then the system selects a third-party content loading technique that does not overload the processor of the client device or the network connection of the client device.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
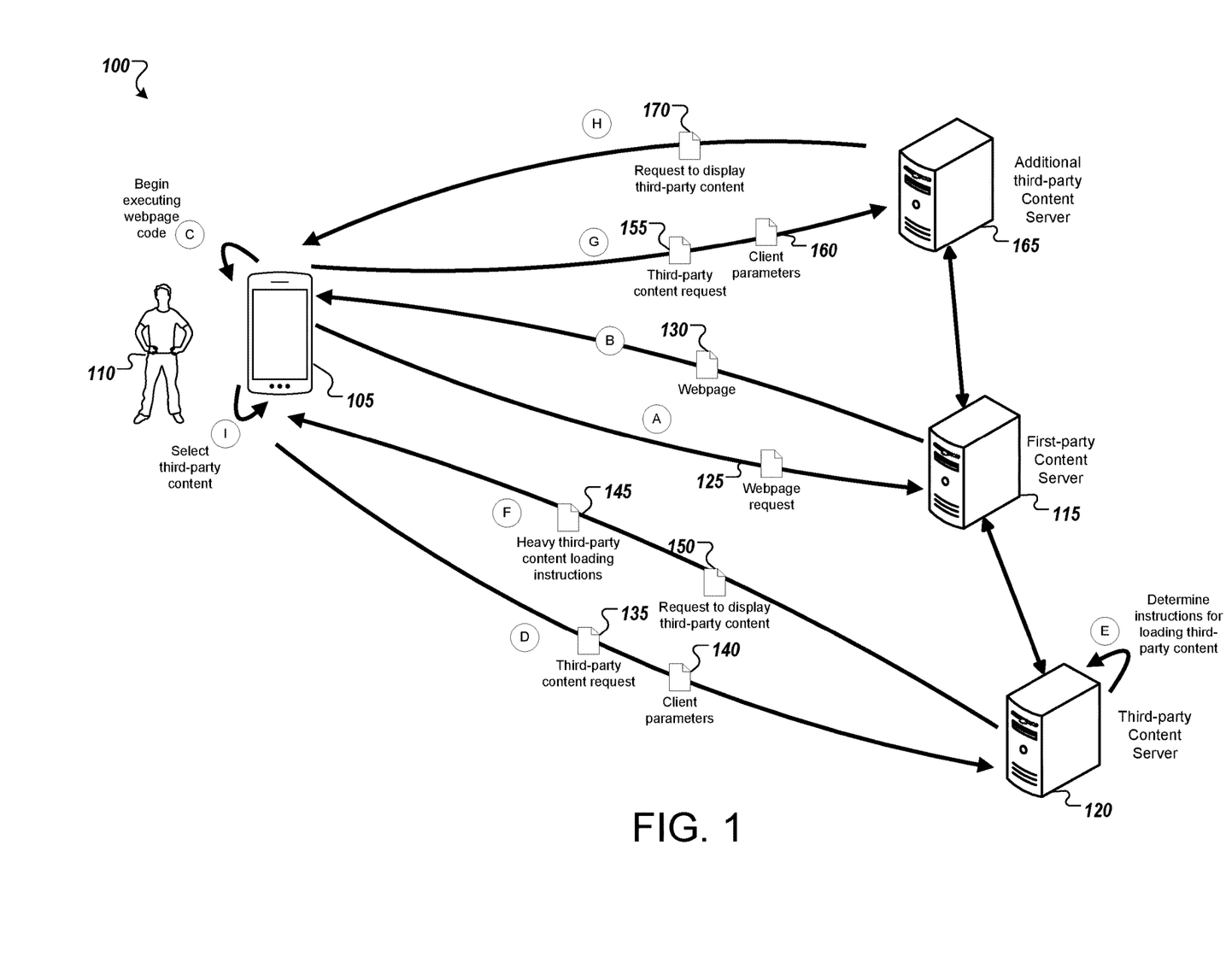
FIG. 1 is an example system for providing third-party content to a client device using a heavy content loading technique.

FIG. 1 is an example system 100 for providing third-party content to a client device 105 using a heavy content loading technique. Briefly, and as described in more detail below, the user 110 of the client device 105 requests to view a webpage on the client device 105. The webpage includes first-party content and space for third-party content. The third-party content server 115 may dynamically provide instructions for how the client device 105 should load the third-party content depending on the processing capability of the client device 105 or the bandwidth of the network connection of the client device or both.

In the example shown in FIG. 1, user 110 accesses an application or web browser on the client device 105 and requests to view content. For example, the user 110 may request to load a news website in a web browser or view sports scores in an application. The news or sports content may be considered first-party content as the content is provided by the publisher of the webpage and may be provided to the client device 105 by the first-party content server 115. The publisher of the webpage may also include space for third-party content in the webpage or application. This third-party content may originate from a different company or entity than the publisher. A third-party content server 120 may provide the third-party content to the client device 105.

In stage A, the first-party content server 115 receives a webpage request 125 from the client device 105. The first-party content server 115 accesses a database that includes first-party content. As an example, the user 110 may request to view the example.com webpage on the client device 105. The client device 105 sends a webpage request 125 to the first-party content server 115 for the example.com webpage. The first-party content server 115 accesses the code for the example.com homepage.

In stage B, the first-party content server 115 transmits the webpage 130 to the client device 105. The webpage 130 may represent the code for the webpage. For example, the webpage 130 may include HTML and a script for the client device 105 to execute to display the example.com webpage.

In stage C, the client device 105 executes the code of the webpage 130. The code of the webpage 130 may include a header that initiates the process for loading third-party content onto the webpage 130. The header may instruct the client device 105 to transmit, in stage D, a third-party content request 135 to the third-party content server 120. The header may also include instructions to transmit client parameters 140 of the client device 105 to the third-party content server 120. The client parameters 140 may include a cookie ID, the IP address, the user agent, and any other similar parameters.

In some implementations, the client device 105 may transmit the third-party content request 135 and the client parameters 140 through the first-party content server 115. In this instance, the client device 105 executes the code of the webpage 130 in stage C. In response to executing the code of the webpage 130 and in stage D, the client device 105 transmits the third-party content request 135 and the client parameters 140 to the first-party content server 115. The first-party content server 115 provides the third-party content request 135 and the client parameters 140 to the third-party content server 120. In some implementations, the third-party content request 135 and the client parameters 140 may be transmitted with the webpage request 125 to the first-party content server 115 in stage A.

In some implementations, the first-party content server 115 may automatically transmit a third-party content request 135 and the client parameters 140 to the third-party content server 120 in response to the first-party content server 115 accessing the first-party content in stage A. In this instance, the first-party content server 115 may execute the header to determine a third-party content request 135. Additionally, the first-party content server 115 may obtain client parameters 140 from the received webpage request 125 in stage A. The first-party content server 115 may transmit the generated third-party content request 135 and the client parameters 140 to the third-party content server 120.

In stage E, the third-party content server 120 analyzes the third-party content request 135 and the client parameters 140 to determine a technique for loading the third-party content on the client device 105. The third-party content server 120 may compute scores for different third-party content loading techniques by applying a model to the client parameters 140 and additional parameters. The scores may reflect any combination of a likelihood that the client device 105 will render the third-party content, a likelihood that the user 110 will select the third-party content, and an expected yield for the third-party content when the client device 105 loads third-party content with a particular loading technique. The third-party content server 120 may select the third-party content loading technique with a highest score.

For the example of FIG. 1, the client parameters 140 may indicate that the user 110 is located in the United States based on the IP address, that the client device 105 is a smart phone that was manufactured in the last year based on the user agent, and that the client device 105 is running a modern browser. In some implementations, the third-party content server 120 may estimate a connection speed of the client device 105 based on the IP address and the speed at which the third-party content server 120 receives data from the client device 105. In this example, the third-party content server 120 may estimate that the connection speed is 20 Mbps.

The third-party content server 120 applies the client parameters 140 to a model that generates scores for each of the third-party loading techniques. The model may generate a likelihood of the third-party content rendering on the client device 105. A more powerful client device may be more likely to properly render third-party content because some third-party content may include processor intensive animations or scripts. The model may generate a likelihood of the user 110 selecting the third-party content rendered on the client device 105. The likelihood of selection may be related to the likelihood of rendering because the user 110 may be unable to select a third-party content item that does not render. The model may also generate an expected yield for each third-party loading technique. In some implementations, the expected yield may be related to the expected revenue that a first-party entity may be expected to earn using a particular loading technique. More complex loading techniques may allow for comparison among more third-party content items and third-party content servers to identify third-party content items on the client device as the page loads. Less powerful client devices may be unable to load a webpage in a timely manner while comparing third-party content items and accessing multiple third-party content servers.

The model may use the likelihood of the third-party content rendering on the client device 105 to generate a score for each third-party loading technique. In some embodiments, the likelihood of the third-party content rendering on the client device 105 may be combined with other factors such as the likelihood of the user 110 selecting the third-party content and/or the expected yield for each of the third-party loading techniques to generate a score for each third-party loading technique. For the example in FIG. 1, the score for a heavy third-party loading technique may be 0.9. The score for a medium third-party loading technique may be 0.75. The score for a light third-party loading technique may be 0.5. The higher score for the heavy third-party loading technique may be reflective of the processing capabilities and network capacity of the client device 105. The client device 105 may be able to process and compare more third-party content items and select richer (e.g., animated, Flash content, scripts, etc.) third-party content items. In the example of FIG. 1, the third-party content server 120 selects the heavy third-party content loading technique.

In stage F, the third-party content server 120 transmits instructions 145 to the client device for using the heavy third-party loading technique. As part of the heavy third-party loading technique, the third-party content server 120 may analyze third-party content items that are available for serving by the third-party content server 120. The third-party content server 120 may select a third-party content item based upon a predetermined criterion, for example a third-party content item with the highest yield subject to any restrictions provided in the third-party content request 135 (e.g., no third-party content items related to specified subjects). The third-party content server 120 may provide, to the client device, a request to display a selected third-party content item 150 and the corresponding yield for the selected third-party content item. With the heavy third-party loading technique, the client device 105 may compare selected third-party content items from multiple third-party content servers. In some implementations, the instructions 145 and the request to display the selected third-party content item 150 may be transmitted to the client device 105 via the first-party content server 115.

The client device 105 receives the instructions 145 to use the heavy third-party loading technique and the request to display the selected third-party content item 150. As part of the heavy third-party loading technique, the client device requests, from additional third-party content servers, additional requests to display third-party content items. Each request to display a third-party content item received from a third-party content server may include a corresponding yield. As part of the heavy third-party loading technique, the client device 105 may select the third-party content item with the highest yield.

At stage G, the client device 105 transmits a third-party content request 155 to an additional third-party content server 165. The client device 105 may transmit additional third-party content requests to additional third-party content servers in addition to the one illustrated in FIG. 1. The client device 105 may transmit the client parameters 160. In some implementations, the client device 105 may transmit any combination of the cookie ID, the IP address, and the user agent. The additional third-party content server 165 analyzes third-party content items that are available to the additional third-party content server 165 and selects a third-party content item, for example a third-party content item with a highest yield subject to any restrictions provided in the third-party content request 155 (e.g., no third-party content items related to specified subjects).

In stage H, the additional third-party content server 165 provides the request 170 to display a selected third-party content item and the corresponding yield to the client device 105. In some implementations, the communications of stage G and H may be through the first-party content server 115.

In stage I, the client device 105 analyzes the request 170 to display a selected third-party content item and the request 150 to display a selected third-party content item. The client device 105 selects the third-party content item with the highest yield. The client device 105 provides a tag or link for the third-party content item to the DOM of the webpage. The client device 105 completes loading of the webpage and requests the actual third-party content item from the corresponding third-party content server. The client device 105 renders the third-party content item for possible selection by the user 110.

Figure 2:
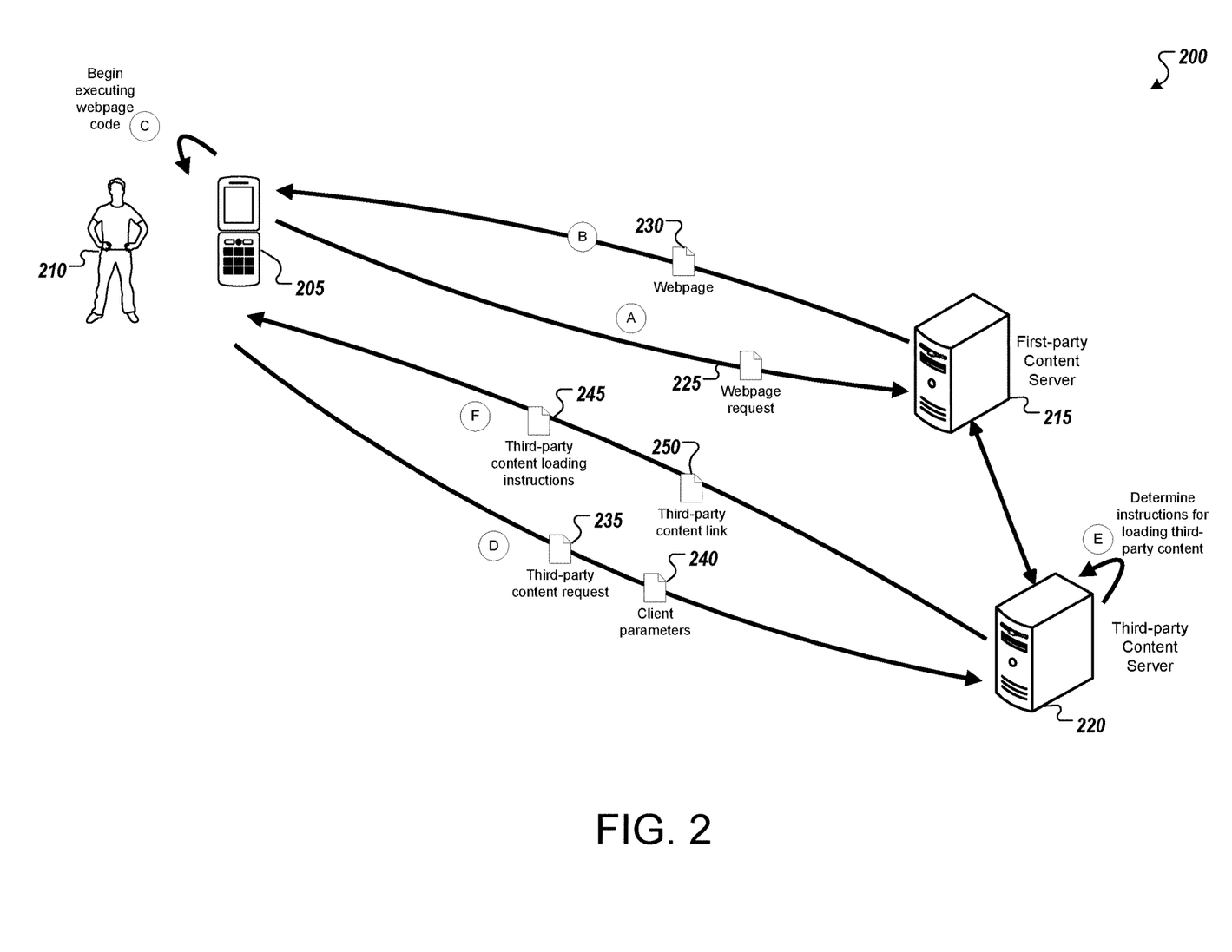
FIG. 2 is an example system for providing third-party content to a client device using a light content loading technique.

FIG. 2 is an example system 200 providing third-party content to a client device using a light content loading technique. Briefly, and as described in more detail below, the user 210 of the client device 205 requests to view a webpage on the client device 205. The webpage includes first-party content and space for third-party content. The third-party content server 215 may dynamically provide instructions for how the client device 205 should load the third-party content depending on the processing capability of the client device 205 or the bandwidth of the network connection of the client device or both.

In the example shown in FIG. 2, user 210 access an application or web browser on the client device 205 and requests to view content. For example, the user 210 may request to load a news website in a web browser or view sports scores in an application. The news or sports content may be considered first-party content as the content is provided by the publisher of the webpage and may be provided to the client device 205 by the first-party content server 215. The publisher of the webpage may also include space for third-party content in the webpage or application. This third-party content may originate from a different company or entity than the publisher. A third-party content server 220 may provide the third-party content to the client device 205.

In stage A, the first-party content server 215 receives a webpage request 225 from the client device 205. The first-party content server 215 accesses a database that includes first-party content. As an example, the user 210 may request to view the example.com webpage on the client device 205. The client device 205 sends a webpage request 225 to the first-party content server 215 for example.com webpage. The first-party content server 215 accesses the code for the example.com homepage.

In stage B, the first-party content server 215 transmits the webpage 230 to the client device 205. The webpage 230 may represent the code for the webpage. For example, the webpage 230 may include HTML and scripts for the client device 205 to execute to display the example.com webpage.

In stage C, the client device 205 executes the code of the webpage 230. The code of the webpage 230 may include a header that initiates the process for loading third-party content onto the webpage 230. The header may instruct the client device 105 to transmit, in stage D, a third-party content request 235 to the third-party content server 220. The header may also include instructions to transmit client parameters 240 of the client device 205. The client parameters 240 may include a cookie ID (or another identifier), the IP address, the user agent, and any other similar parameters.

In some implementations, the client device 205 may transmit the third-party content request 235 and the client parameters 240 through the first-party content server 115. In this instance, the client device 205 executes the code of the webpage 230 in stage C. In response to executing the code of the webpage 230, the client device 205 transmits the third-party content request 235 and the client parameters 240 to the first-party content server 215. The first-party content server 215 provides the third-party content request 235 and the client parameters 240 to the third-party content server 220. In some implementations, the third-party content request 235 and the client parameters 240 may be transmitted with the webpage request 225 to the first-party content server 215 in stage A.

In some implementations, the first-party content server 215 may automatically transmit a third-party content request 235 and the client parameters 240 to the third-party content server 220 in response to the first-party content server 215 accessing the first-party content in stage A. In this instance, the first-party content server 215 may execute the header to determine a third-party content request 235. Additionally, the first-party content server 215 may obtain client parameters 240 from the received webpage request 225 in stage A. The first-party content server 215 may transmit the third-party content request 235 and the client parameters 240 to the third-party content server 220.

In stage E, the third-party content server 220 analyzes the third-party content request 235 and the client parameters 240 to determine a technique for the third-party content on the client device 205. The third-party content server 220 may compute scores for different third-party content loading techniques by applying a model to the client parameters 240 and additional parameters. The scores may reflect any combination of a likelihood that the client device 205 will render the third-party content, a likelihood that the user 210 will select the third-party content, and an expected yield for the third-party content when the client device 205 loads third-party content with a particular loading technique. The third-party content server 220 may select the third-party content loading technique with a highest score.

For the example of FIG. 2, the client parameters 240 may indicate that the user 210 is located in India based on the IP address, that the client device 105 is a flip phone that was manufactured between eight and ten years ago based on the user agent, and that the client device 105 is running a reduced version of a browser (e.g., a browser that may not be able to display Flash animations, etc.). In some implementations, the third-party content server 220 may estimate a connection speed of the client device 205 based on the IP address and the speed at which the third-party content server 220 receives data from the client device 205. In this example, the third-party content server 220 may estimate that the connection speed is 100 kbps.

The third-party content server 220 supplies the client parameters 240 to a model that generates scores for each of the third-party loading techniques. The model may generate a likelihood of the third-party content rendering on the client device 205. A less powerful client device may be less likely to properly render third-party content because some third-party content may include processor intensive animations or scripts which may overwhelm an older, less powerful client device. The model may generate a likelihood of the user 210 selecting the third-party content rendered on the client device 205. The likelihood of selection may be related to (or specify) the likelihood of rendering because the user 210 may be unable to select a third-party content item that does not render. The model may also generate an expected yield for each third-party loading technique. In some implementations, the expected yield may be related to, be based on, or specify the expected revenue that a first-party entity may be expected to earn using a particular loading technique. More complex loading techniques may allow for comparison among more third-party content items and third-party content servers. Less powerful client devices may be unable to load a webpage in a timely manner and compare third-party content items and access multiple third-party content servers.

The model may use the likelihood of the third-party content rendering on the client device 105 to generate a score for each third-party loading technique. In some embodiments, the likelihood of the third-party content rendering on the client device 205 may be combined with the likelihood of the user 210 selecting the third-party content and/or the expected yield for each of the third-party loading techniques to generate a score for each third-party loading technique. For the example in FIG. 2, the score for a heavy third-party loading technique may be 0.3. The score for a medium third-party loading technique may be 0.6. The score for a light third-party loading technique may be 0.75. The higher score for the light third-party loading technique may be reflective of the processing capabilities and network capacity of the client device 205. The client device 205 may be able to process and compare few third-party content items and select lighter (e.g., JPEG, GIF, etc.) third-party content items that typically have a lower yield. In the example of FIG. 2, the third-party content server 220 selects the light third-party content loading technique.

In stage F, the third-party content server 220 transmits instructions 245 to the client device for using the light third-party loading technique. As part of the light third-party loading technique, the third-party content server 220 may analyze third-party content items that are available for serving by the third-party content server 220. The third-party content server 220 may select a third-party content item, for example a third-party content item with the highest yield subject to any restrictions provided in the third-party content request 235 (e.g., no third-party content items related to specified subjects). The third-party content server 220 may provide, to the client device 205, a link to the selected third-party content item 250. With the light third-party loading technique, the client device 205 may receive the link to the selected third-party content item 250, place the link in the document object model ("DOM") of the webpage code, and render the webpage. The client device 205 may request the linked third-party content item. In some implementations, the instructions 245 and the link to the selected third-party content item 250 may be transmitted to the client device 205 via the first-party content server 215. In some implementations, the third-party content server 220 may transmit the selected third-party content item instead of a link 250 to the third-party content item.

In some implementations, the link 250 to a third-party content item that is passed from the header into the DOM of the webpage may be a link to multiple possible third-party content items. The first-party content server 215 may dynamically choose one of the possible third-party content items after receiving a request from the client device 205 the link of the multiple possible third-party content items. In response, the first-party content server 215 provides the dynamically chosen third-party content item to the client device 205. This may be further applied to each of the light content loading technique, the medium content loading technique, and the heavy content loading technique as described below.

Figure 3:
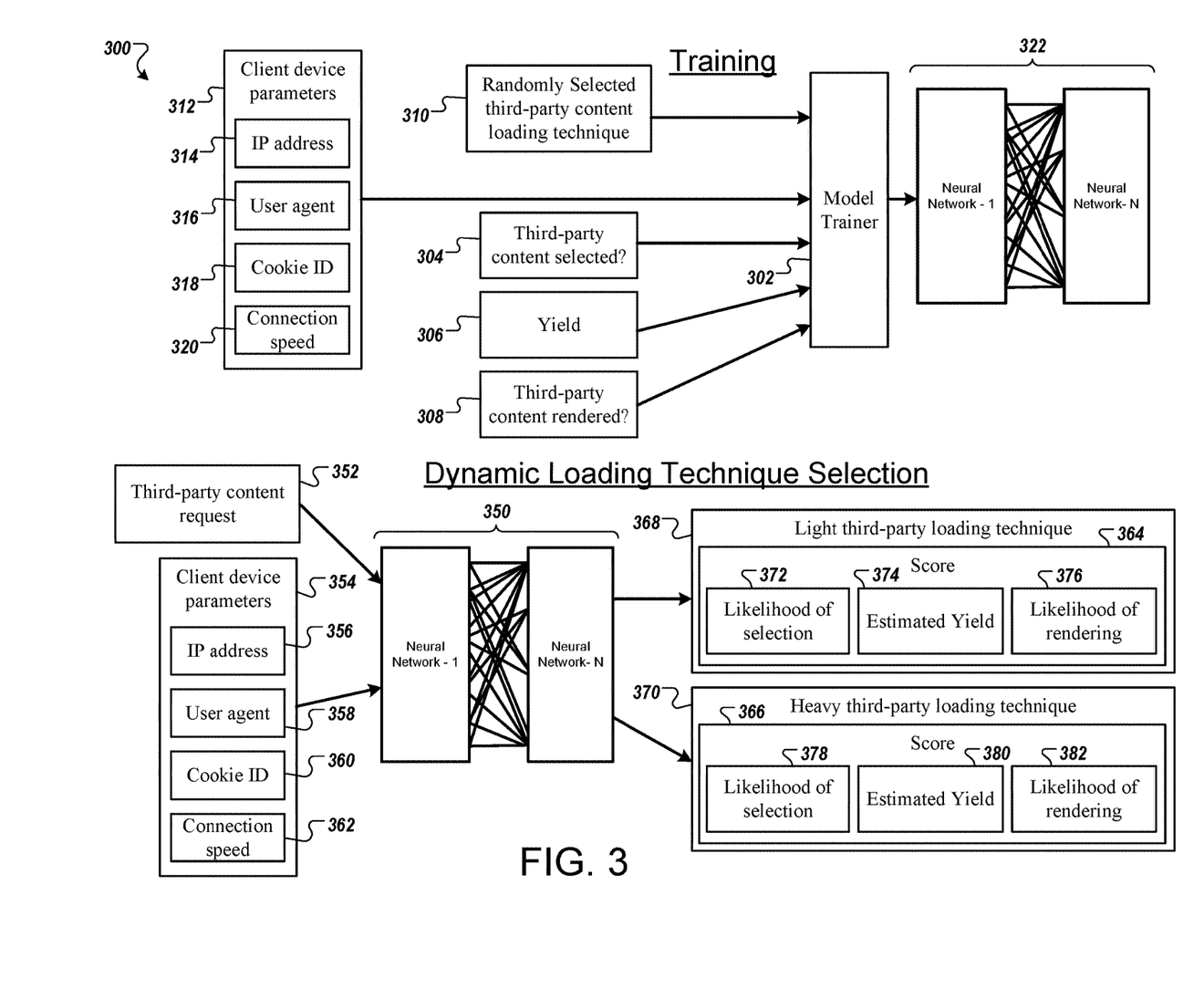
FIG. 3 is an example system for training and applying a model that is configured to select a third-party content loading technique based on client device parameters.

FIG. 3 is an example system 300 training and applying a model that is configured to select a third-party content loading technique based on client device parameters. Briefly, and as described in more detail below, the system 300 illustrates the training phase for the model that is configured to generate scores for each of the third-party content loading techniques. The system 300 also illustrates the usage of the model in selecting a third-party content loading technique. In some implementations, the third-party content server 120 of FIG. 1 and the third-party content server 220 of FIG. 2 may train and apply the model.

As illustrated in the training phase of FIG. 3, the model trainer 302 receives data from different client devices where the third-party content server selected a third-party loading technique at random. The different client devices include both newer client devices with modern hardware and software that have the processing power to render complex webpages and handle communications with multiple third-party content servers and older client devices with older hardware and software that have lower processing power, are able to render simple webpages, and may only be able to handle communications one or two third-party content servers. The different client devices may be on different networks with different connection speeds. Some newer client devices may be on slower networks. Some older client devices may be on faster networks.

The system collects data from the client devices executing the randomly selected third-party loading techniques. The system 300 may collect selection data 304 that indicates whether the user selected, or interacted with, the third-party content item selected for display on the client device. The system 300 may collect yield data 306 that indicates the yield collected by the first-party content provider for displaying or any conversions related to the user's interaction with the third-party content item. The system 300 collects render data 308 that indicates whether the third-party content item rendered properly on the client device.

For each third-party content item rendering or attempted rendering, the model trainer 302 receives loading technique data 310. The loading technique data 310 indicates the loading technique used by the client device to request and load third-party content. The model trainer 302 receives the render data 308. The model trainer may additionally receive, for each third-party content item rendering or attempted rendering, selection data 304, and yield data 306. The model trainer 302 also receives client device parameters 312 for each third-party content item rendering or attempted rendering. The client device parameters 312 include the IP address 314 of the client device, the user agent 316 of the client device, the cookie ID 318 of the client device, and the connection speed 320 of the client device.

As an example, the model trainer 302 may receive loading technique data 310 indicating that the client device used a heavy third-party content loading technique. The selection data 304 may indicate that the user selected the third-party content item. The yield data 306 may indicate that the first-party content provider earned ten cents for displaying and the user's interaction with the third-party content item. The render data 308 may indicate that the client device properly rendered the third-party content item. The IP address may be 12.123.123.12. The model may use the IP address directly or may look up other information associated with the IP address, like the city in which this IP address is physically emanating from. The user agent may be Mozilla/5.0 (Windows NT 6.1; Win64; x64; rv:47.0) Gecko/20100101 Firefox/47.0 Mozilla/5.0 (Macintosh; Intel Mac OS X x.y; rv:42.0) Gecko/20100101 Firefox/42.0. The model may use the user agent directly or look up associated data, such as the make, model, software, and hardware capabilities of the device to which this user agent belongs. The cookie ID may include information related to the user or may be an ID that is then used to look up additional information stored on the third-party content associated with the user. The connection speed may indicate that the connection speed is 5 Mbps.

As another example, the model trainer 302 may receive loading technique data 310 indicating that the client device used a light third-party content loading technique. The selection data 304 may indicate that the user did not select the third-party content item. The yield data 306 may indicate that the first-party content provider earned three cents for displaying the third-party content item. The render data 308 may indicate that the client device properly rendered the third-party content item. The IP address may be 51.213.213.15. The user agent may be Mozilla/5.0 (X11; Linux x86_64) AppleWebKit/537.36 (KHTML, like Gecko) Chrome/51.0.2704.103 Safari/537.36. The cookie ID may include information related to the user. The connection speed may indicate that the connection speed is 15 Mbps.

The model trainer 302 uses the data from each rendering or attempted rendering of a third-party content item where the system used a random third-party loading technique to train a neural network model 322 or any other type of machine learning model. The neural network model may include an input layer, an output layer, and one or more hidden layers. The model trainer 302 may use a machine learning technique to continuously train the model 322 as the system 300 receives more data when applying the model.

As illustrated in the dynamic third-party loading technique selection phase of FIG. 3, the system 300 applies the trained model 350 to dynamically generate scores for each third-party loading technique. The system 300 may apply the trained model 350 to the parameters of the client device in response to the client device requesting third-party content. In some implementations, the third-party content server 120 of FIG. 1 and the third-party content server 220 of FIG. 2 may apply the trained model 350.

The system 300 receives third-party content request data 352. The third-party content request data 352 indicates that the client device is requesting a third-party content item as the client device is processing and loading first-party content, such as a webpage. In some implementations, a first-party content server may transmit the third-party content request data 352. The first-party content server may receive the third-party content request data 352 from a client device, and it may be included in the same request that requests the rest of the webpage to load in the browser. The system 300 receives client device parameters 354. The client device parameters 354 include the IP address 356, the user agent 358, the cookie ID 360, and an estimation of the connection speed 362. The client device parameters 354 are the parameters of the client device that is loading the first-party content and the third-party content.

The system 300 applies the client device parameters 354 to the trained model 350. The trained model 350 generates scores 364 and 366 that correspond to a light third-party loading technique 368 and a heavy third-party loading technique 370. The system 300 may apply the trained model 350 to additional third-party loading techniques to generate scores. By applying the trained model 350, the system 300 may generate, for the light third-party loading technique 368, a likelihood of selection score 372 that reflects a likelihood that a user will select third-party content when loaded using the light third-party loading technique 368. The system 300 may generate, for the light third-party loading technique 368, an estimated yield 374 that reflects an estimated payout to the first-party content provider upon displaying and/or a user interacting with third-party content when loaded using the light third-party loading technique 368. The system 300 generates, for the light third-party loading technique 368, a likelihood of rendering score 376 that reflects a likelihood that third-party content will render when loaded using the light third-party loading technique 368. As an example, the trained model 350 may generate, for the light third-party loading technique 368, a likelihood of selection score 372 of 0.4, an estimated yield 374 of five cents, and a likelihood of rendering score 376 of 0.95. The combined score 364 may be 0.75. In some embodiments the system uses the likelihood of rendering score 382 as the score 364

By applying the trained model 350, the system 300 may generate, for the heavy third-party loading technique 370, a likelihood of selection score 378 that reflects a likelihood that a user will select third-party content when loaded using the heavy third-party loading technique 370. The system 300 may generate, for the heavy third-party loading technique 370, an estimated yield 380 that reflects an estimated payout to the first-party content provider upon displaying and/or a user interacting with third-party content when loaded using the heavy third-party loading technique 370. The system 300 generates, for the heavy third-party loading technique 370, a likelihood of rendering score 382 that reflects a likelihood that third-party content will render when loaded using the heavy third-party loading technique 370. As an example, the trained model 350 may generate, for the heavy third-party loading technique 370, a likelihood of selection score 372 of 0.5, an estimated yield 374 of eight cents, and a likelihood of rendering score 376 of 0.85. The combined score 364 may be 0.80. In some embodiments the system uses the likelihood of rendering score 382 as the score 364.

In this instance, the system 300 compares the combined score 364 of 0.75 for the light third-party loading technique 368 to the combined score 364 of 0.80 for the heavy third-party loading technique 370. Based on the comparison the system 300 selects the heavy third-party loading technique 370.

The model trainer 302 may receive feedback from the system 300. The feedback may be similar to the data used to train the model 322. The system may provide the feedback to the model trainer 302 to tune the trained model 350. For example, the system 300 may use the trained model 350 to select the light third-party loading technique. The system 300 may receive data indicating that the user did not select the third-party content item, the yield for the third-party content item was five cents, and the third-party content item rendered properly. The system 300 may receive data indicating the parameters of the client device that displayed the third-party content item. The model trainer 302 may use the parameters of the client device, the selection data, the yield, the render data, and the identity of the third-party loading technique to update the trained model 350. Separate models may be used for predicting the likelihood that content will render successfully, the likelihood the user will interact with the third-party content item, and the estimated yield if a user does successfully interact with the third-party content item. The outputs of one or all of these models may be used to score and select each possible ad loading technique.

Figure 4:
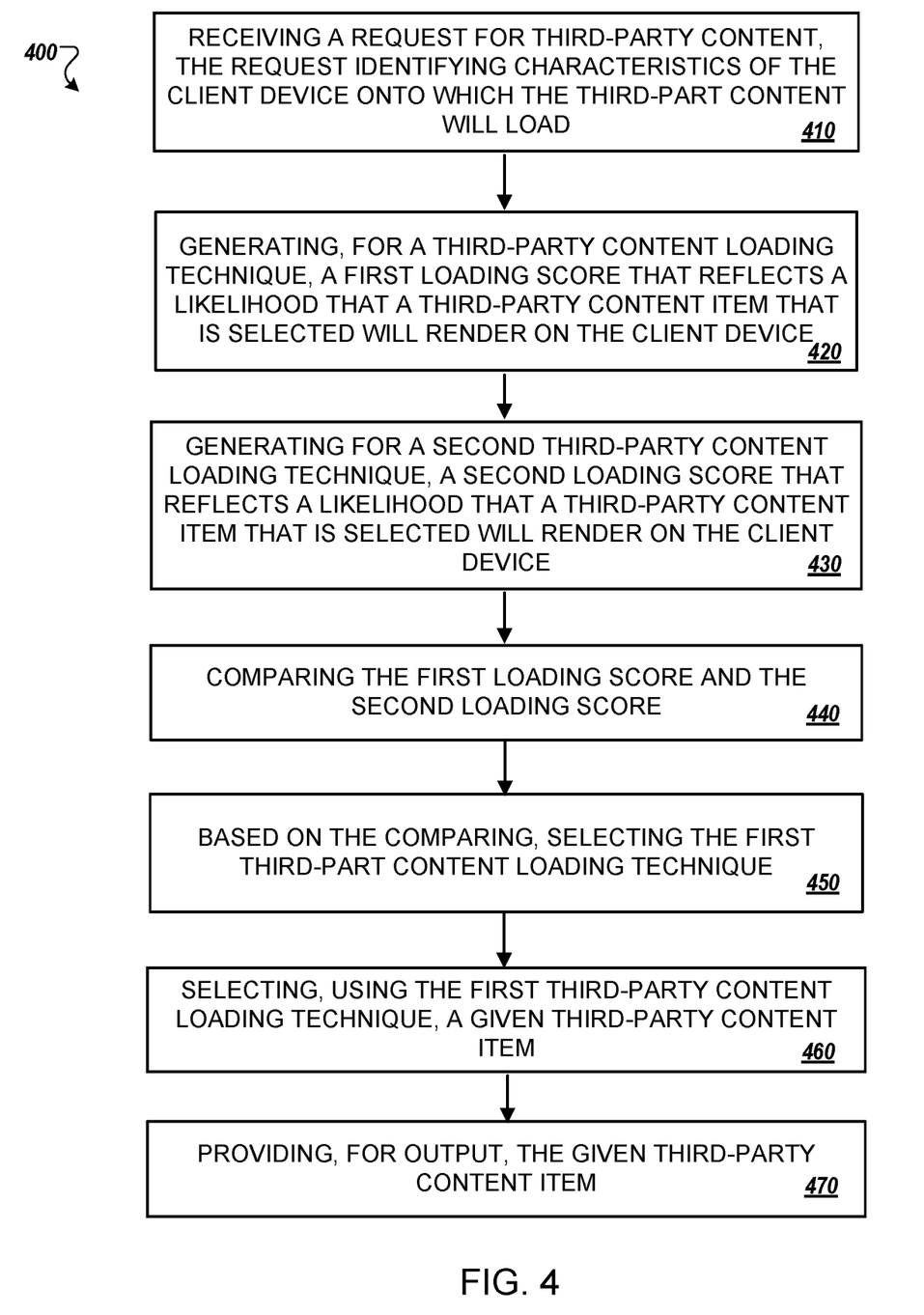
FIG. 4 is a flowchart of an example process for dynamically selecting a content loading technique.

FIG. 4 is a flowchart of an example process 400 for dynamically selecting a content loading technique. In general, the process 400 analyzes the parameters of a client device that requests third-party content. The process 400 may select a processor and network intensive loading technique for third-party content in instances where the client device is powerful and has a strong network connection. The process 400 may select a less processor- and network-intensive loading technique for third-party content in instances where the client device is less powerful and has a weaker network connection. The process 300 will be described as being performed by a computer system comprising one or more computers, for example, the computing system 100 as shown in FIG. 1, the computing system 200 as shown in FIG. 2, or the computing system 300 as shown in FIG. 3.

The system receives, by a computing device, a request for third-party content, the request including data identifying characteristics of the client device onto which the third-party content will load (410). In some implementations, the characteristics of the client device include a browser version, a model of the client device, and a network connection type. The system may identify the browser version and model of the client device from the user agent. The system may estimate the network connection type and speed based on the speed the system receives data from the client device and an IP address of the client device, which may identify the location of the client device.

The system, based on the data identifying the characteristics of the client device, generates, for a first third-party content loading technique, a first loading score that reflects a likelihood that a third-party content item that is selected using the first third-party content loading technique will render on a display of the client device (420). In some implementations, the first loading score may reflect a likelihood that a user will select the third-party content item. In some implementations, the first loading score may reflect an expected yield that the first-party content provider may earn when the client device uses the first third-party content loading technique. In some implementations, the client device loads first-party content using a different technique than loading third-party content. For example, the client device may receive instructions from a first-party content server and execute those instructions to render the first-party content. The client device may receive different instructions from the first-party content server or from a third-party content server for requesting and rendering the third-party content.

The system, based on the data identifying the characteristics of the client device, generates, for a second third-party content loading technique, a second loading score that reflects a likelihood that a third-party content item that is selected using the second third-party content loading technique will render on the display of the client device (430). In some implementations, the second loading score may reflect a likelihood that a user will select the third-party content item. In some implementations, the second loading score may reflect an expected yield that the first-party content provider may earn when the client device uses the second third-party content loading technique.

In some implementations, the system trains a model that is configured to generate, for each third-party content loading technique, the loading scores based on the characteristics of the client device. In some implementations, the system receives data identifying characteristics of a plurality of client devices, third-party loading techniques used to load a plurality of third-party content items on the plurality of client devices, data indicating whether each third-party content item rendered on a display of a respective client device, and data indicating whether a user selected each third-party content item. The system may generate this data by randomly selecting third-party loading techniques for different third-party content requests. In some implementations, the system uses the data identifying characteristics of the plurality of client devices, the third-party loading techniques used to load the plurality of third-party content items on the plurality of client devices, the data indicating whether each third-party content item rendered on the respective client device, and the data indicating whether a user selected each third-party content item to train a model that is configured to generate a loading score that reflects a likelihood that a third-party content item that is selected using a given third-party content loading technique will render on a display of a given client device and that a user will select the third-party content item.

The system compares the first loading score to the second loading score (440). The system, based on comparing the first loading score to the second loading score, selects the first third-party content loading technique (450). In some implementations, the system may compare expected yields for each third-party content loading technique and select a third-party content loading technique. The system may select the third-party content loading technique with the highest expected yield.

The system selects, using the first third-party content loading technique, a given third-party content item (460). The system provides, for output, the given third-party content item (470).

In some implementations, the system may receive an additional request for third-party content from the client device. In this instance, the characteristics of the client device may be different. For example, the client device may be located in a remote area where the network connection is slow. In this instance, the system may select a different third-party content loading technique.

In some implementations, the system receives data indicating whether the user selected the third-party content time, data indicating whether the client device rendered the third-party content item, and data indicating the yield earned by the first-party content provider. The system may use this selection data, render data, and yield data along with the third-party content loading technique and the characteristics of the device to update the model.

In some implementations, the first third-party content loading technique is header bidding. In header bidding, the client device receives instructions to request third-party content from multiple different third-party content servers. The client device compares each of the third-party content items and their respective yields to select a third-party content item. Because the client device communicates with multiple different third-party content servers and compares yields from each third-party content item returned from the third-party content servers, the client device performs a significant portion of the processing to select a third-party content loading technique. Header bidding may be considered a heavy third-party content loading technique.

In some implementations, the first third-party content loading technique involves the client device requesting a third-party content item from a third-party content server. The third-party content server may request third-party content from additional third-party content servers and compare the yield from the third-party content items accessible by the third-party content server to the yields from the third-party content items returned by the additional third-party content servers. This may be a medium third-party content loading technique. The lighter version of this technique involves the third-party content server not requesting additional third-party content from the additional third-party content servers. These techniques use less resources of the client device because the client device does not compare the yields of different third-party content items. The version where the third-party content server requests third-party content from additional third-party content servers may be a heavier technique because of the delay involved in requesting the additional third-party content.

In some implementations, the first third-party content loading technique involves pre-caching the third-party content item the client device requesting a third-party content item from a third-party content server. In this technique, the third-party content server may cache third-party content items on the client device. The third-party content server may then instruct the client device to display a particular pre-cached third-party content item by comparing the yields of the pre-cached third-party content items. This technique may be the lightest because the third-party content items are already on the client device. The client device only receives an instruction to display a particular pre-cached third-party content item.

Figure 5:
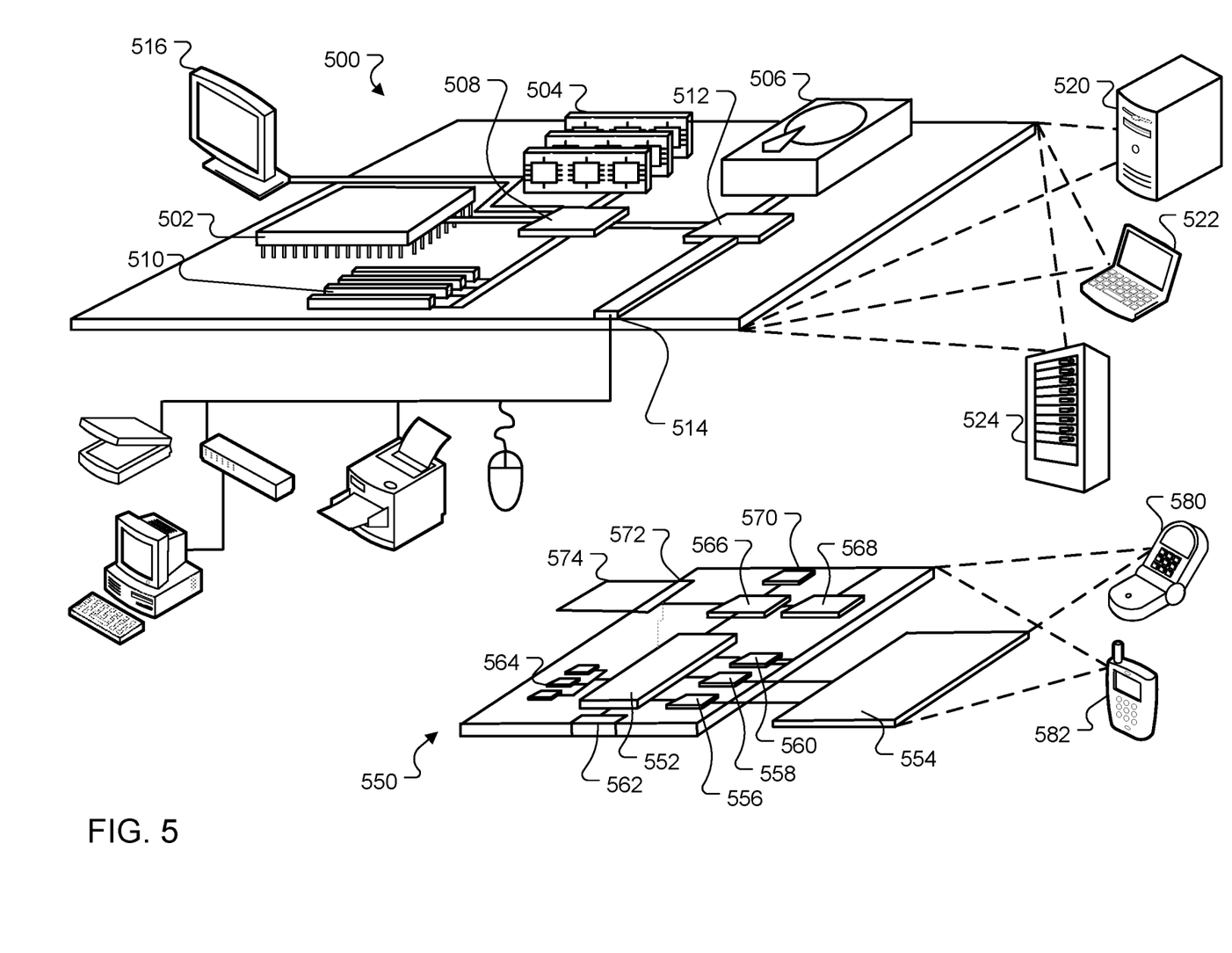
FIG. 5 is an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, wireless (e.g., Bluetooth) headsets, hearing aid, smart watches, smart glasses, activity trackers, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, a microphone, speakers, or a networking device such as a switch or router, e.g., through a network adapter.

The computing device 500 may be implemented in a number of different forms, as shown in the figure. For example, it may be implemented as a standard server 520, or multiple times in a group of such servers. In addition, it may be implemented in a personal computer such as a laptop computer 522. It may also be implemented as part of a rack server system 524. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a touch-enabled display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

For situations in which the systems discussed herein collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

The invention claimed is:

1. A computer-implemented method comprising:
receiving, by a computing device, a request for third-party content, the request including data identifying characteristics of the client device onto which the third-party content will load;
based on the data identifying the characteristics of the client device, generating, for a first third-party content loading technique, a first loading score that reflects a likelihood that a third-party content item that is selected using the first third-party content loading technique will render on a display of the client device;
based on the data identifying the characteristics of the client device, generating, for a second third-party content loading technique, a second loading score that reflects a likelihood that a third-party content item that is selected using the second third-party content loading technique will render on the display of the client device;
comparing the first loading score to the second loading score;
based on comparing the first loading score to the second loading score, selecting the first third-party content loading technique;
selecting, using the first third-party content loading technique, a given third-party content item;
providing, for output, the given third-party content item;
receiving, by the computing device, an additional request for third-party content, the additional request including different data identifying the characteristics of the client device onto which the third-party content will load;
based on the different data identifying the characteristics of the client device, generating, for the first third-party content loading technique, an additional first loading score that reflects an additional likelihood that an additional third-party content item that is selected using the first third-party content loading technique will render on the display of the client device;
based on the different data identifying the characteristics of the client device, generating, for the second third-party content loading technique, an additional second loading score that reflects an additional likelihood that an additional third-party content item that is selected using the second third-party content loading technique will render on the display of the client device;
comparing the additional first loading score to the additional second loading score;
based on comparing the additional first loading score to the additional second loading score, selecting the second third-party content loading technique;
selecting, using the second third-party content loading technique, an additional given third-party content item; and
providing, for output, the additional given third-party content item.

2. The method of claim 1, wherein the characteristics of the client device comprise a browser version, a model of the client device, and a network connection type.

3. The method of claim 1, wherein:
the first loading score further reflects a likelihood that a user will select the third-party content item that is selected using the first third-party content loading technique, and
the second loading score further reflects a likelihood that a user will select the third-party content item that is selected using the second third-party content loading technique.

4. The method of claim 1, comprising:
receiving data identifying characteristics of a plurality of client devices, third-party loading techniques used to load a plurality of third-party content items on the plurality of client devices, data indicating whether each third-party content item rendered on a display of a respective client device, and data indicating whether a user selected each third-party content item; and
using the data identifying characteristics of the plurality of client devices, the third-party loading techniques used to load the plurality of third-party content items on the plurality of client devices, the data indicating whether each third-party content item rendered on the respective client device, and the data indicating whether a user selected each third-party content item, training a model that is configured to generate a loading score that reflects a likelihood that a third-party content item that is selected using a given third-party content loading technique will render on a display of a given client device and that a user will select the third-party content item, wherein the first loading score and the second loading score are generated using the model.

5. The method of claim 4, comprising:
receiving data indicating that the third-party content item rendered on the display of the client device;
receiving data indicating that a user selected the third-party content item; and
based on the data indicating that the third-party content item rendered on the display of the client device and based on the data indicating that the user selected the third-party content item, updating the model.

6. The method of claim 1, wherein the client device displays the given third-party content item in a first-party document and loads the first-party document using a loading technique that is different than the first third-party content loading technique and the second third-party content loading technique.

7. The method of claim 1, comprising:
before receiving the request for third-party content, storing, by the computing device and on the client device, a plurality of third-party content items that correspond to a plurality of third-party content display requests,
wherein selecting, using the first third-party content loading technique, the given third-party content item comprises:
analyzing the plurality of third-party content display requests; and
based on analyzing the plurality of third-party content display requests, selecting, from among the plurality of third-party content items, a third-party content item as the given third-party content item.

8. The method of claim 1, wherein selecting, using the first third-party content loading technique, the given third-party content item comprises:
accessing, from one or more servers, a plurality of third-party content display requests and corresponding third-party content items;
analyzing the plurality of third-party content display requests; and
based on analyzing the plurality of third-party content display requests, selecting a third-party content item as the given third-party content item.

9. The method of claim 1, wherein selecting, using the first third-party content loading technique, the given third-party content item comprises:
accessing a plurality of third-party content display requests and corresponding third-party content items;
analyzing the plurality of third-party content display requests;
based on analyzing the plurality of third-party content display requests, selecting a third-party display request; and
providing, to the client device, the third-party display request,
wherein the client device (i) selects, from among the third-party display request and other third-party display requests received from other servers, a given third-party display request that corresponds to the given third-party content item based on analyzing the third-party display request and the other third-party display requests and (ii) requests the given third-party content item.

10. A system comprising:
one or more computers; and
one or more storage devices storing instructions that are operable, when executed by the one or more computers, to cause the one or more computers to perform operations comprising:
receiving a request for third-party content, the request including data identifying characteristics of the client device onto which the third-party content will load;
based on the data identifying the characteristics of the client device, generating, for a first third-party content loading technique, a first loading score that reflects a likelihood that a third-party content item that is selected using the first third-party content loading technique will render on a display of the client device;
based on the data identifying the characteristics of the client device, generating, for a second third-party content loading technique, a second loading score that reflects a likelihood that a third-party content item that is selected using the second third-party content loading technique will render on the display of the client device;
comparing the first loading score to the second loading score;
based on comparing the first loading score to the second loading score, selecting the first third-party content loading technique;
selecting, using the first third-party content loading technique, a given third-party content item;
providing, for output, the given third-party content item;
receiving an additional request for third-party content, the additional request including different data identifying the characteristics of the client device onto which the third-party content will load;
based on the different data identifying the characteristics of the client device, generating, for the first third-party content loading technique, an additional first loading score that reflects an additional likelihood that an additional third-party content item that is selected using the first third-party content loading technique will render on the display of the client device;
based on the different data identifying the characteristics of the client device, generating, for the second third-party content loading technique, an additional second loading score that reflects an additional likelihood that an additional third-party content item that is selected using the second third-party content loading technique will render on the display of the client device;
comparing the additional first loading score to the additional second loading score;
based on comparing the additional first loading score to the additional second loading score, selecting the second third-party content loading technique;
selecting, using the second third-party content loading technique, an additional given third-party content item;
providing, for output, the additional given third-party content item.

11. The system of claim 10, wherein the characteristics of the client device comprise a browser version, a model of the client device, and a network connection type.

12. The system of claim 10, wherein:
the first loading score further reflects a likelihood that a user will select the third-party content item that is selected using the first third-party content loading technique, and
the second loading score further reflects a likelihood that a user will select the third-party content item that is selected using the second third-party content loading technique.

13. The system of claim 10, wherein the instructions cause the one or more computers to perform operations comprising:
receiving data identifying characteristics of a plurality of client devices, third-party loading techniques used to load a plurality of third-party content items on the plurality of client devices, data indicating whether each third-party content item rendered on a display of a respective client device, and data indicating whether a user selected each third-party content item; and
using the data identifying characteristics of the plurality of client devices, the third-party loading techniques used to load the plurality of third-party content items on the plurality of client devices, the data indicating whether each third-party content item rendered on the respective client device, and the data indicating whether a user selected each third-party content item, training a model that is configured to generate a loading score that reflects a likelihood that a third-party content item that is selected using a given third-party content loading technique will render on a display of a given client device and that a user will select the third-party content item,
wherein the first loading score and the second loading score are generated using the model.

14. The system of claim 13, wherein the instructions cause the one or more computers to perform operations comprising:
receiving data indicating that the third-party content item rendered on the display of the client device;
receiving data indicating that a user selected the third-party content item; and
based on the data indicating that the third-party content item rendered on the display of the client device and based on the data indicating that the user selected the third-party content item, updating the model.

15. The system of claim 10, wherein the client device displays the given third-party content item in a first-party document and loads the first-party document using a loading technique that is different than the first third-party content loading technique and the second third-party content loading technique.

16. A non-transitory computer-readable medium storing software comprising instructions executable by one or more computers which, upon such execution, cause the one or more computers to perform operations comprising:
receiving a request for third-party content, the request including data identifying characteristics of the client device onto which the third-party content will load;
based on the data identifying the characteristics of the client device, generating, for a first third-party content loading technique, a first loading score that reflects a likelihood that a third-party content item that is selected using the first third-party content loading technique will render on a display of the client device;
based on the data identifying the characteristics of the client device, generating, for a second third-party content loading technique, a second loading score that reflects a likelihood that a third-party content item that is selected using the second third-party content loading technique will render on the display of the client device;
comparing the first loading score to the second loading score;
based on comparing the first loading score to the second loading score, selecting the first third-party content loading technique;
selecting, using the first third-party content loading technique, a given third-party content item;
providing, for output, the given third-party content item;
receiving an additional request for third-party content, the additional request including different data identifying the characteristics of the client device onto which the third-party content will load;
based on the different data identifying the characteristics of the client device, generating, for the first third-party content loading technique, an additional first loading score that reflects an additional likelihood that an additional third-party content item that is selected using the first third-party content loading technique will render on the display of the client device;
based on the different data identifying the characteristics of the client device, generating, for the second third-party content loading technique, an additional second loading score that reflects an additional likelihood that an additional third-party content item that is selected using the second third-party content loading technique will render on the display of the client device;
comparing the additional first loading score to the additional second loading score;
based on comparing the additional first loading score to the additional second loading score, selecting the second third-party content loading technique;
selecting, using the second third-party content loading technique, an additional given third-party content item; and
providing, for output, the additional given third-party content item.

17. The non-transitory computer-readable medium of claim 16, wherein the characteristics of the client device comprise a browser version, a model of the client device, and a network connection type.

18. The non-transitory computer-readable medium of claim 16, wherein:
the first loading score further reflects a likelihood that a user will select the third-party content item that is selected using the first third-party content loading technique, and
the second loading score further reflects a likelihood that a user will select the third-party content item that is selected using the second third-party content loading technique.

19. The non-transitory computer-readable medium of claim 16, wherein the instructions cause the one or more computers to perform operations comprising:
receiving data identifying characteristics of a plurality of client devices, third-party loading techniques used to load a plurality of third-party content items on the plurality of client devices, data indicating whether each third-party content item rendered on a display of a respective client device, and data indicating whether a user selected each third-party content item; and using the data identifying characteristics of the plurality of client devices, the third-party loading techniques used to load the plurality of third-party content items on the plurality of client devices, the data indicating whether each third-party content item rendered on the respective client device, and the data indicating whether a user selected each third-party content item, training a model that is configured to generate a loading score that reflects a likelihood that a third-party content item that is selected using a given third-party content loading technique will render on a display of a given client device and that a user will select the third-party content item, wherein the first loading score and the second loading score are generated using the model.

20. The non-transitory computer-readable medium of claim 19, wherein the instructions cause the one or more computers to perform operations comprising:

receiving data indicating that the third-party content item rendered on the display of the client device;

receiving data indicating that a user selected the third-party content item; and based on the data indicating that the third-party content item rendered on the display of the client device and based on the data indicating that the user selected the third-party content item, updating the model.

* * * * *